(12) United States Patent
Bella (10) Patent No.: US 7,305,006 B1
(45) Date of Patent: Dec. 4, 2007

(54) SYSTEM FOR ALLOWING A SINGLE DEVICE TO SHARE MULTIPLE TRANSMISSION LINES

(75) Inventor: Gregory L. Bella, Naperville, IL (US)

(73) Assignee: Westell Technologies, Inc., Aurora, IL (US)

( * ) Notice: Subject to any disclaimer, the term of this patent is extended or adjusted under 35 U.S.C. 154(b) by 1089 days.

(21) Appl. No.: 10/225,947

(22) Filed: Aug. 22, 2002

Related U.S. Application Data (60) Provisional application No. 60/314,854, filed on Aug. 24, 2001.

(51) Int. Cl.
*H04L 12/66* (2006.01)
*H04L 12/28* (2006.01)

(52) U.S. Cl. .................................. 370/463; 379/93.05
(58) Field of Classification Search ................ 370/494, 370/495
See application file for complete search history.

(56) References Cited

U.S. PATENT DOCUMENTS

| | | | |
|---|---|---|---|
| 6,252,453 B1 | 6/2001 | Nayler | |
| 6,285,754 B1* | 9/2001 | Sun et al. | 379/399.02 |
| 6,389,110 B1 | 5/2002 | Fischer et al. | |
| 6,393,109 B1* | 5/2002 | Willer | 379/90.01 |
| 6,424,221 B1 | 7/2002 | Korn | |
| 6,427,237 B1 | 7/2002 | Aranguren et al. | |
| 6,473,495 B1* | 10/2002 | Willer | 379/90.01 |
| 6,507,608 B1* | 1/2003 | Norrell | 375/219 |
| 6,597,768 B2* | 7/2003 | Yamano et al. | 379/93.05 |
| 6,618,469 B2* | 9/2003 | Wang et al. | 379/1.01 |
| 6,778,549 B1* | 8/2004 | Keller | 370/430 |
| 6,778,646 B1* | 8/2004 | Sun | 379/93.05 |
| 6,819,745 B2* | 11/2004 | Hollenbeck et al. | 379/1.03 |
| 6,996,067 B1* | 2/2006 | Burke et al. | 370/248 |
| 2002/0003835 A1 | 1/2002 | Wu | |
| 2002/0026528 A1 | 2/2002 | Lo | |
| 2002/0057717 A1 | 5/2002 | Mallory | |
| 2002/0079985 A1 | 6/2002 | Siadat et al. | |
| 2002/0091861 A1 | 7/2002 | Kim et al. | |
| 2002/0136394 A1* | 9/2002 | Snow et al. | 379/399.01 |

* cited by examiner

*Primary Examiner*—Daniel J. Ryman
(74) *Attorney, Agent, or Firm*—McDonnell Boehnen Hulbert & Berghoff LLP (57) ABSTRACT

A front end, such as can be used in a Home Phoneline Networking Alliance network, may connected to a plurality of transmission lines. Each of the plurality of transmission lines may connected to one or more devices, such as a plain old telephone service device or an asynchronous digital subscriber line device. Devices connected to different transmission lines may then communicate with each other over the Home Phoneline Networking Alliance network.

23 Claims, 5 Drawing Sheets

SYSTEM FOR ALLOWING A SINGLE DEVICE TO SHARE MULTIPLE TRANSMISSION LINES

RELATED APPLICATION

This application claims priority to U.S. Provisional Patent Application 60/314,854, titled "System and Method for Allowing a Single Device to Share Multiple Transmission Lines," which was filed on Aug. 24, 2001.

FIELD OF THE INVENTION

The present invention relates to sharing transmission lines in networks. More specifically, it relates to a system and method for sharing transmission lines between different types of networks.

BACKGROUND OF THE INVENTION

Recently, home networking technologies have appeared that allow, for example, simultaneous, shared Internet access, printer/peripheral sharing, file and application sharing and networked gaming. In addition, these technologies allow consumers to enjoy the use of each of these home entertainment and information applications using existing wiring in the home. One of these home-networking technologies is promulgated by the Home Phone Network Alliance ("HPNA"). Other examples of home networking technologies also exist.

Home networking technologies generally use internal home wiring, such as a telephone line, to provide communication among devices located both inside and outside of the home. The telephone line may be, for example, a direct analog voice line. In another example, the telephone line may be an analog derived voice line, such as can be used to support Voice over ATM ("VoATM"), Voice over Internet Protocol ("VoIP") or other digital technologies. HPNA systems may be designed to share the telephone line with standard analog plain old telephone system ("POTS") service and asynchronous digital subscriber line service ("ADSL").

A home may have one or more telephone lines, such as one or more copper pairs. Each telephone line may provide a separate connection, such as to a central office ("CO"), and one or more devices may be connected to each telephone line. Although a home may include more than one telephone line, current HPNA systems are only designed to function over a single POTS line. Thus, a first device connected to one of the home telephone lines could not use these home network technologies to communicate with a second device connected a different home telephone line.

Therefore, there exists a need to provide an improve system and method for allowing a single device to share multiple transmission lines.

SUMMARY OF THE INVENTION

A front end, such as can be used in a Home Phoneline Networking Alliance network, may connected to a plurality of transmission lines. For example, the front end may connect to a plurality of twisted-pair telephone lines located within a home or other structure. The front end may connect to each of the plurality of transmission lines through a blocking capacitance.

Each of the plurality of transmission lines may connected to one or more devices, such as a plain old telephone service device or an asynchronous digital subscriber line device. The transmission lines may also connect to a subscriber line interface circuit, which may in turn support a derived voice line. Devices connected to different transmission lines may then communicate with each other over the Home Phoneline Networking Alliance network.

These as well as other aspects and advantages of the present invention will become apparent from reading the following detailed description, with appropriate reference to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
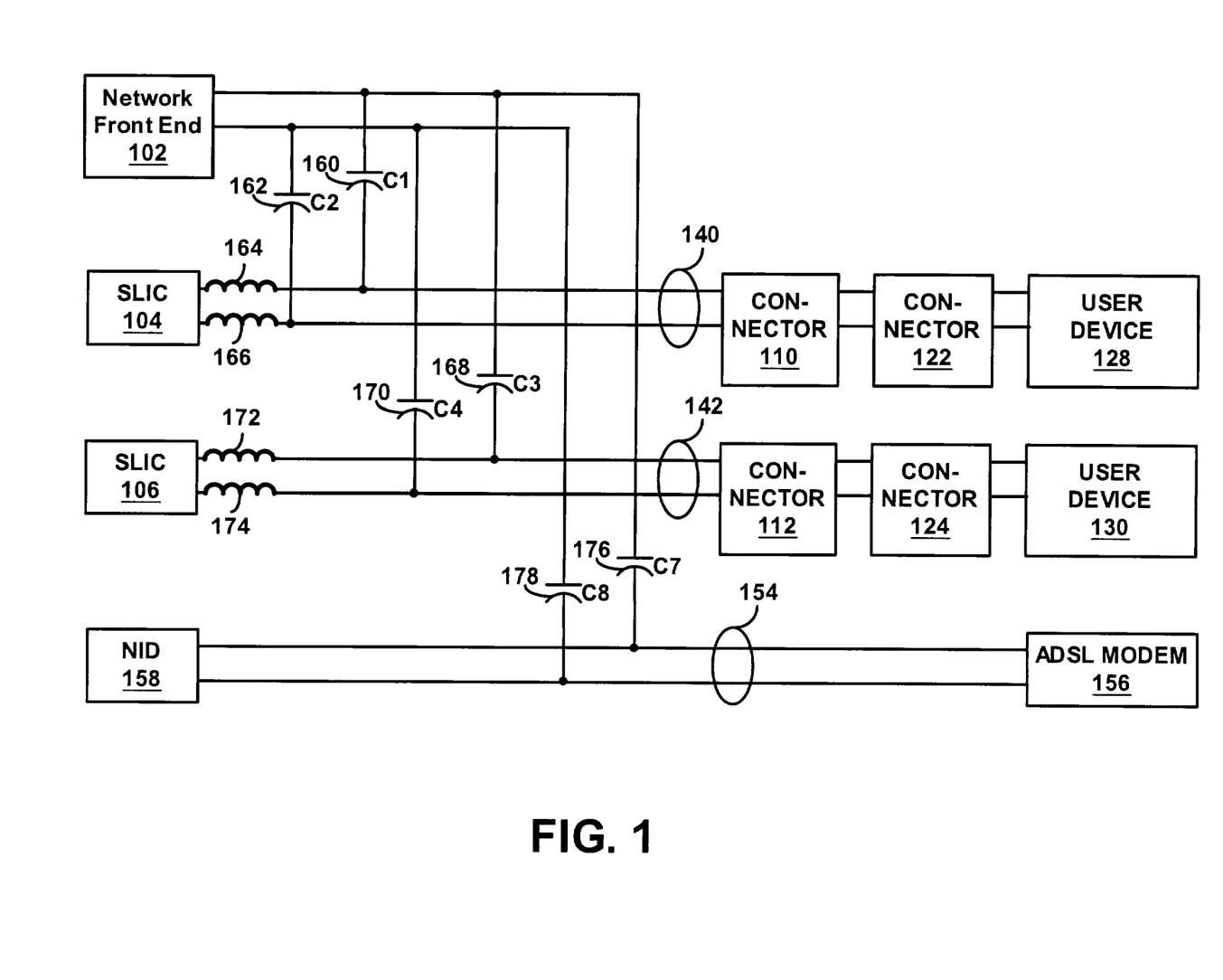
FIG. 1 is a block diagram of a preferred embodiment of a system that can be used to allow a single device to share multiple transmission lines.

FIG. 1 is a block diagram of a preferred embodiment of a system that can be used to allow a single device to share multiple transmission lines. As shown in FIG. 1, a front end 102 connects to multiple transmission lines 140, 142, 154. The transmission lines 140, 142, 154 may be, for example, twisted pair copper wires located within a home. Of course, other types of wiring may also be used. It should also be understood that the home is merely exemplary in nature, and this configuration may be used in any other structure or networked environment.

A first user device 128 connects to one of the transmission lines 140, and a second user device 130 connects to another of the transmission lines 142. The user devices 128, 130 may be any type of device used to communicate any type of information. For example, the user devices 128, 130 may be telephones, computers, printers, fax machines, personal digital assistants ("PDAs") or any other type of device. In addition, the user devices 128, 130 may be devices that provide access to other devices, for example a modem.

The first user device 128 connects to the transmission line 140 through two connectors 110, 122. The second user device also connects to its respective transmission line 142 through two connectors 112, 124. The connectors 110, 112, 122, 124 may be RJ-11 connectors, such as are commonly used in home wiring. Of course, other types of connectors may also be used, or the user devices 128, 130 may connect directly to the transmission lines 140, 142 without using any connectors. Also, the user devices 128, 130 may connect to their respective transmission lines 140, 142 using different methods.

A subscriber line interface circuit ("SLIC") 104 provides an interface between the transmission line 140 and a network, such as a network that may support voice over IP ("VoIP") or voice over ATM ("VoATM") derived voice lines. Another SLIC 106 provides an interface between the other transmission line 142 and a network, which may also support VoIP or VoATM derived voice lines. The SLIC 104 connects to the twisted-pair transmission line 140 through two inductors 150, 152. Similarly, the SLIC 106 connects to the twisted-pair transmission line 142 through two inductors.

The functions of the SLICs 104, 106 may be implemented by a combination of analog electronic elements and computer executing computer instructions stored in a memory. The SLICs 104, 106 may perform a variety of different functions. For example, the SLICs 104, 106 may support derived voice lines, such as VoIP or VoATM. The transport mechanism of the derived voice line to a central office ("CO") may be, for example, a broadband technology such as ADSL, HDSL, G.SHDSL or cable. Of course, other broadband technologies may also be used, or other transport mechanisms may be used. The SLICs 104, 106 may perform other functions, such as ringing analog phones. Of course, the SLICs 104, 106 are not limited to these examples, but they may perform other functions.

FIG. 1 also depicts an asynchronous digital subscriber line ("ADSL") modem 156 connected to a transmission line 154. ADSL is a technology that can be used to send high-speed data over a twisted-pair telephone line. In ADSL, a portion of the available bandwidth can be used to support POTS services, such as a voice call. Another portion of the bandwidth can be used to support high-speed data communications. By using separate bandwidths for POTS and ADSL data, the ADSL system can support simultaneous voice and data communications over a single telephone line. ADSL is described in more detail in American National Standard Institute ("ANSI") standard T1.413-1998.

An ADSL modem 156 generally handles the ADSL signaling used for communication over the transmission line 154. The ADSL modem can receive signals sent over the transmission line 154, and it can decode the signals and provide the signals to an attached device, such as a phone or computer. The ADSL modem 154 can also receive data from the attached device, encode the data into an ADSL signaling format and send the data over the transmission line 154. Using the functionality provided by the ADSL modem 156, a device connected to the ADSL modem 156 may send and receive data over the transmission line 154. The ADSL modem 156 may additionally encode and decode voice signals for transmission over a derived voice line. The ADSL modem 156 may also encode and decode data signals for transmission over the HPNA network. While FIG. 1 depicts the ADSL modem 156 as an external device, the ADSL modem 156 may alternatively be an internal device.

The transmission line 154 in turn connects to a network interface device ("NID") 158, such as can be used to provide an interface between a central office and the transmission line 154. The NID may include the functionality of an ADSL modem, which can be used to encode and decode ADSL signals. The NID may support derived voice lines, and the NID may support communication over another data network.

It should be understood that the configuration described in FIG. 1 is merely exemplary in nature, and various modifications may be made. For example, while FIG. 1 depicted one user device connected to each transmission line, each transmission line may alternatively connected to more than one device. Additionally, while FIG. 1 depicts a single ADSL modem 156 connected to the transmission line 154, the transmission line 154 may connect to more than one ADSL modem or ADSL device. As yet another alternative, a transmission line may connect to a combination of POTS and ADSL devices. Additional transmission lines, such as analog POTS lines, may also be used.

In other embodiments, the system may include a greater or fewer number of transmission lines. In yet another embodiment, the system may include no transmission lines capable of carrying ADSL services. For example, the system may include only POTS devices. In yet another embodiment, the system may include multiple transmission lines capable of support ADSL or other digital subscriber line ("DSL") services. Of course, other variations are also possible.

The system of FIG. 1 may be communicatively coupled to a network, for example, a home phone network alliance ("HPNA") network that may supply data packets to other HPNA devices, such as computers, printers or other devices. Other networking technologies, however, may also be used. For example, Homeplug may also be used. When used with an HPNA network, the front end 102 may include some or all of the functionality included in HPNA Physical Specification 2.0, which is incorporated herein by reference in its entirety. Additionally, one or more of the devices 128, 130, 156 may be an HPNA transceiver. The user devices 128, 130, 156 may be multi-function devices. For example, a user device may be a workstation, such as may perform POTS, ADSL and/or HPNA functions. In another embodiment, one or more of the devices 128, 130, 156 may couple to an HPNA transceiver, which may in turn couple to another device, such as a computer, printer or other device.

Figure 2:
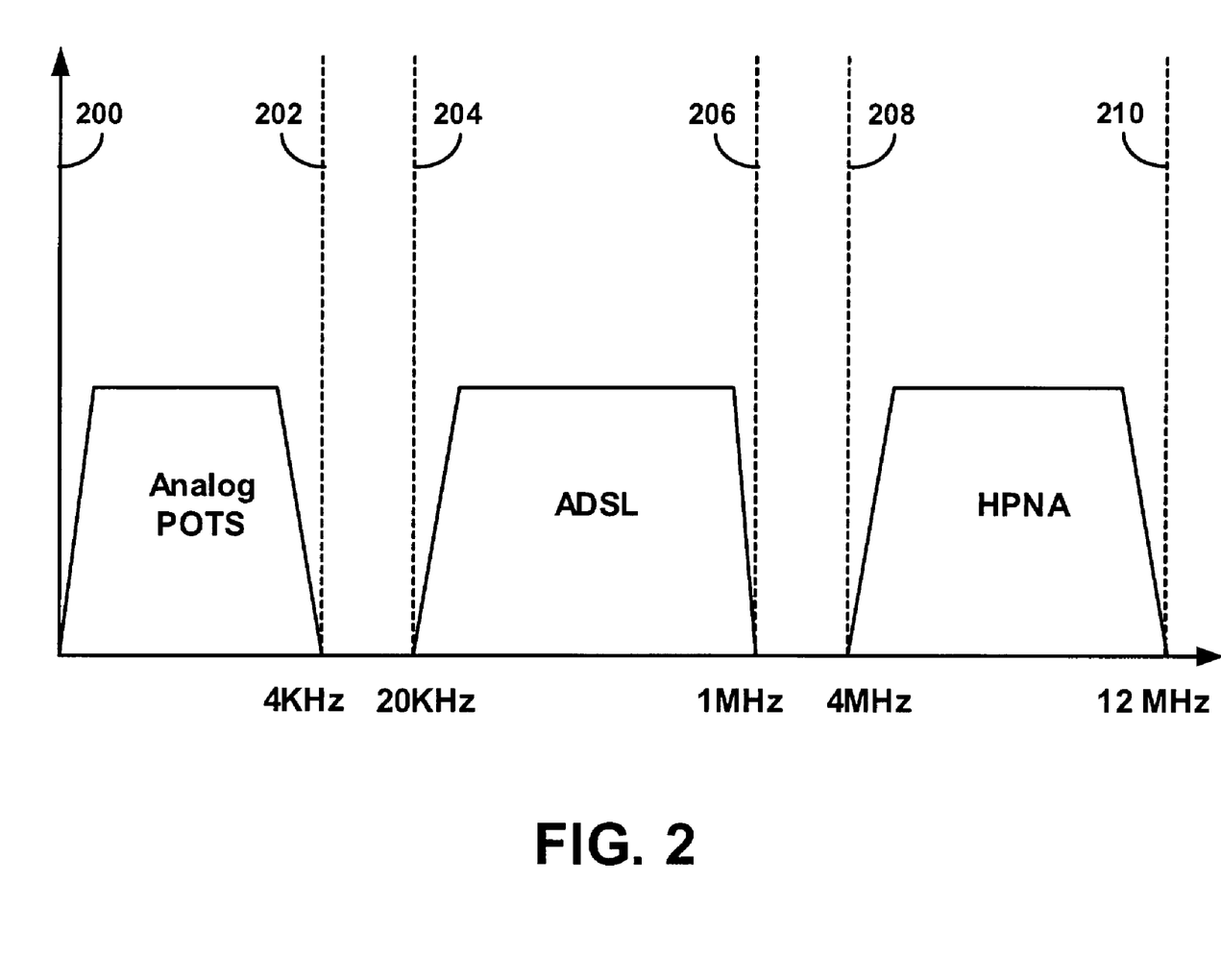
FIG. 2 is a block diagram of a preferred signal spectrum that can be used with the system of FIG. 1.

FIG. 2 is a block diagram of a preferred signal spectrum that can be used with the system of FIG. 1. As shown in FIG. 2, the signal spectrum includes three signal ranges. A POTS range, denoted by endpoints 200 and 202, may carry analog POTS signals. This range generally encompasses the frequencies from 0 Hz to 4 KHz. An ADSL frequency, denoted by endpoints 204 and 206, may carry ADSL signals. The ADSL range is ordinarily from 20 KHz to 1 MHz. An HPNA range, from approximately 4 MHz to 12 MHz, may be used to carry HPNA signals. The HPNA range is denoted in FIG. 2 by endpoints 208 and 210.

Of course, it should be understood that the signal spectrum depicted in FIG. 2 is merely exemplary in nature, and many different changes may be used. For example, different frequency ranges may be used for the POTS, ADSL or HPNA ranges. In another example, DSL services other than ADSL may use different frequency ranges. Additionally, the system may support a fewer or greater number of services and thus a different number of frequency ranges. For example, the system may support only HPNA, it may support HPNA and POTS, it may support HPNA and ADSL, or it may support a different combination of services.

The front end 102 couples to the transmission lines 140, 142, 154 through a network of capacitors and inductors. The front end 102 couples to the transmission line 144 through capacitors C1 160 and C2 162. In turn, capacitor C1 160 connects to the SLIC 104 through an inductor 164, and capacitor C2 162 connects to the SLIC 104 through an inductor 166. The front end 102 also couples to the transmission line 142 through two capacitors, C3 168 and C4 170. Capacitor C3 168 in turn connects to the SLIC 106 through an inductor 172, and capacitor C4 170 connects to the SLIC 106 through an inductor 172.

For example, the front end 102 may include a filter. In a preferred embodiment, the filter does not include a DC blocking capacitance. Instead, this DC blocking capacitance is removed from the high pass filter ("HPF") pole and distributed among capacitor C1 160, capacitor C2 162, capacitor C3 168, capacitor C4 170, capacitor C7 176, and capacitor C8 178. Thus, in this preferred embodiment, the front end 102 would generally not include any series high pass filter pole capacitance, and the capacitors C1 160, C2 162, C3 168, C4 170, C7 176, and C8 178 may include the distributed high pass filter pole capacitance. However, the front end 12 may include a high value input capacitance such that it has a minimal effect on the established distributed HPF pole.

The capacitors C1 160, C2 162, C3 168, C4 170, C7 176, and C8 178 may be any type of capacitor. In a preferred embodiment, the capacitors 160, 162, 168, 170, 176, 178 may each be a 3300 pF ceramic capacitor or a 2200 pF metalized polypropylene capacitor. Of course, different capacitors may use different values, and values other than 3300 pF or 2200 pF may also be used. Alternatively, one or more RLC networks may be used to substitute for the capacitors 160, 162, 168, 170, 176, 178.

In a preferred embodiment, the inductors 164, 166, 172, 174 may be RF inductors whose inductance is chosen to look like a short for voice band frequencies and a high impedance to the HPNA frequencies. In a preferred embodiment, the input impedance of the SLICs 104, 106 looking through the inductors is much greater than 100 ohms at the HPNA frequencies, thereby causing the SLICs 104, 106 to appear as a high impedance at the HPNA frequencies. By choosing inductors 164, 166, 172, 174 to have these properties, the SLICs 104, 106 will generally not load down the HPNA driver. However, it is possible that the SLICs 104, 106 may appear as high impedances at the HPNA frequencies without the inductors. For example, the impedance of the SLICs 104, 106 may be greater than 100 ohms at the HPNA frequencies and, therefore, the inductors would not be necessary.

In one example of the operation of the present invention, the front end 102 may be an HPNA front end and may couple a HPNA network with multiple copper pairs 140, 142, 154, which may be POTS derived line wiring, standard POTS lines, ADSL lines or other lines. The analog front end DC blocking capacitance may be distributed among multiple transmission lines. Specifically, C1 160, C2 162, C3 168, C4 170, C7 176, and C8 178 may comprise the DC blocking capacitance and HPF pole, which has been removed from the front end 102.

In this example, distinct derived POTS lines 140, 142, 154, may share the same HPNA data network. The user devices 128, 130, 156 may be coupled together through the high frequency capacitors 160, 162, 168, 170, 176, 178, thereby allowing the user devices 128, 130, 156 to communicate with each other at the HPNA frequencies. However, the capacitors 160, 162, 168, 170, 176, 178 may not couple the user devices 128, 130, 156 at lower frequencies, such as POTS or ADSL frequencies. This may allow the user devices 128, 130, 156 to participate in separate POTS and ADSL sessions without interfering with another device's POTS and ADSL sessions, while at the same time sharing a common data network through HPNA.

The values of the capacitors 160, 162, 168, 170, 176, 178 may be chosen based on the bandwidth of the HPNA network and other bandwidths used on the common transmission lines 140, 142, 154. For example, if the transmission lines 140, 142, 156 only support HPNA, then the capacitor values may be chosen to be large in order to minimize attenuation between the transmission lines 140, 142, 156 at HPNA frequencies.

In a preferred embodiment, they may be chosen to be approximately 0.1 micro-Farads, which would represent an impedance of approximately 0.39 ohms at 4 MHZ. The HPNA devices may then communicate with each other through the capacitors 160, 162, 168, 170, 176, 178 across the different transmission lines 140, 142, 156.

In another example of choosing the capacitor values, the HPNA data network may coexist with only standard POTS service or derived POTS lines. The HPNA data network may be shared over the multiple transmission lines 140, 142 supporting POTS service by adding the distributed capacitors 160, 162, 168, 170. These capacitors 160, 162, 168, 170 may be chosen to be large values to properly transport the HPNA frequencies over the multiple transmission lines 140, 142. If the capacitor vales are chosen to be too large, however, then channel-to-channel voice band crosstalk may become a problem. This may result in a user on one transmission line in the HPNA network overhearing a POTS conversation of another user on another transmission line in the HPNA network. In a preferred embodiment, the capacitors 160, 162, 168, 170 may be 5000 pF capacitors in order to limit the channel-to-channel crosstalk to 105 dB. This crosstalk value assumes a 100 micro-Henry primary inductance for the HPNA front end transformer, and it may vary with different inductance values for the HPNA front end transformer as well as with other factors in the system. The 5000 pF values look like approximately 8 ohms at 4 MHz, and this low impedance may reduce the attenuation between HPNA transceivers communicating across different transmission lines.

In another example of choosing the capacitor values, the HPNA data network may share the transmission lines 140, 142, 156 with ADSL. In this configuration, the capacitors 176, 178 coupling to transmission lines carrying ADSL signals may need to be appropriately adjusted. For example, if the 5000 pF capacitors were used, then the impedance would look like approximately 63 ohms at the ADSL frequency of 500 KHz. This impedance may be too low, and it may load down the ADSL signals. In a preferred embodiment, the capacitors 176, 178 may be 1000 pF capacitors. The capacitors 176, 178 would then each look like approximately 318 ohms or a combined impedance of approximately 636 ohms. The 636 ohm impedance of the capacitors 176, 178 is roughly six times the 100 ohms ADSL impedance. At 1000 pF, the capacitors would look like approximately 40 ohms to the 4 MHz HPNA frequency. Slight HPNA attenuation may occur, however, between HPNA transceivers crossing over the various transmission lines through the capacitors. In spite of this attenuation, the HPNA network would still be able to function, however, its maximum transmission distance may be reduced.

It should be understood that the previous examples describe preferred capacitor values for various configurations of the system described in FIG. 1. These preferred capacitor values were chosen based on the POTS, ADSL and HPNA frequency ranges described in FIG. 2. Various modifications, however, may be made. For example, the capacitor values may be altered to affect the separation properties between the various bands. In another example, different bandwidths may be used for POTS, ADSL or HPNA services. Of course, another home networking technology, such as Homeplug, may be used in place of HPNA, and it may use different bandwidths. In yet another example, other services may be added that may use different bandwidths, and this may also affect the choice of capacitor values. Of course, it is also possible that one or more of the transmission lines 140, 142, 156 may couple using different capacitor values than the other transmission lines. Of course, other changes are also possible.

In addition to selecting the capacitance to adjust performance characteristics of the system, the input impedance looking into the front end 102 may also impact the system's performance. In a preferred embodiment, the impedance looking into the front end 102 (ZINHPNA) may be selected to be a relatively low impedance to the voice band frequency range in order to assist in voice band channel to channel cross talk rejection. If the series HPF capacitance is moved to C1 160, C2 162, C3 168, C4 170, C7 176, C8 178, then ZINHPNA should be related to the shunt primary inductance of the HPNA transformer. This impedance should be a low enough value to look like a low impedance to voice and a high impedance to HPNA. For example, if the inductance were chosen to be 100 uH, than at 4 MHz the impedance magnitude would be approximately 2513 ohms. At 4 KHz the impedance magnitude would be approximately 2.5 ohms.

Table 1 shows exemplary cross talk values for an exemplary system having three POTS transmission lines. Further, the capacitors 160, 162, 168, 170, 176, 178 are 1000 pF capacitors, and one POTS line is on-hook while the other 2 are off hook. For this exemplary system configuration, Table 1 shows cross talk values measured between the channels due to the HPF capacitors C1 160, C2 162, C3 168, C4 170, C7 176, C8 178. Of course, the values depicted in Table 1 are exemplary in nature, and they may vary in any actual implemented based on a variety of different factors, such as the length of the wiring, the wiring type, other devices connected to the wiring, the location of devices connected to the wiring, other interference with the signals transmitted on the wiring, or other factors.

Cross talk Specification=65 dBm0 minimum per TR-57

TABLE 1

| C1-C6 = 1000 pF, Cross talk Calculated at 4KHz | |
|---|---|
| ZINHPNA (magnitude) | Channel to Channel Cross talk |
| 1 M ohm | 48 dB |
| 100 ohm | 100 dB |

For the exemplary system described with reference to Table 1, the HPNA does not share any of the transmission lines with ADSL devices. Thus, none of the POTS transmission lines would be used to send ADSL signals. Therefore, the distributed capacitance may be increased without worry about its effects on the various ADSL bands. The larger capacitance may be necessary to support the proper PSD with this distributed setup. If, however, one or more of the transmission lines carries an ADSL signal, such as the transmission line 154 in FIG. 1, then the capacitor values 176, 178 coupling this line may be chosen to reduce the impedance-loading effects of the distributed capacitance in the various ADSL bands.

Table 2 shows exemplary cross talk values where the input impedance of the analog front end is sufficiently scaled in order to reduce the voice frequency cross talk. For example, if input impedance is scaled from 1 M ohm to 2.5 ohms, the cross talk may be scaled from 35 dB to 105 dB. Of course, these values are also exemplary in nature and may vary depending on a variety of other factors, such as the length of the wiring, the wiring type, other devices connected to the wiring, the location of devices connected to the wiring, other interference with the signals transmitted on the wiring, or other factors.

TABLE 2

| C1-C6 = 5000 pF, Cross talk Calculated at 4KHz | |
|---|---|
| ZINHPNA | Channel to Channel Cross talk |
| 1 M ohm | 35 dB |
| 100 ohm | 72 dB |
| 2.5 ohm (assuming 100 uH primary inductance of AFE) | 105 dB |

Figure 3:
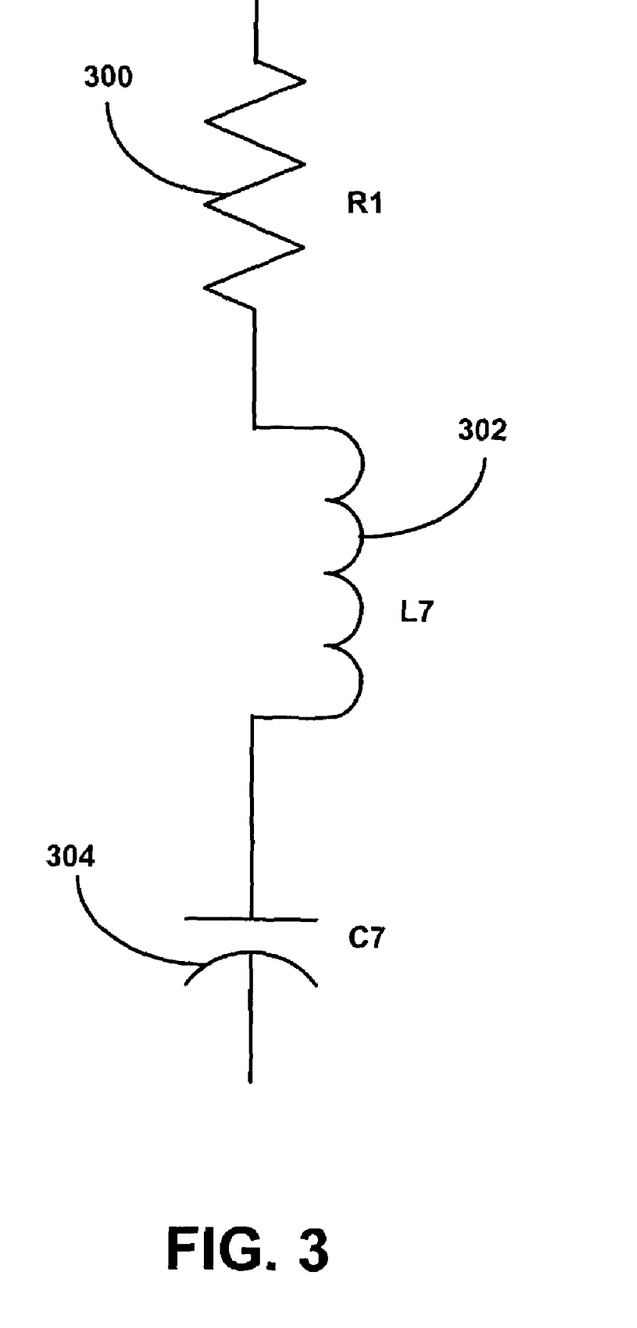
FIG. 3 is a block diagram of a preferred embodiment of an resistor-inductor-capacitor arrangement that can be used with the system of FIG. 1.

FIG. 3 is a block diagram of an RLC network that may be used in place of one or more of capacitors C1 160, C2 162, C3 168, C4 170, C7 176 or C6 178. As depicted in FIG. 3, a resistor 300 couples to an inductor 302, and the inductor 302 couples to a capacitor 304. The values of the resistor 300 and the inductor 302 may be chosen so as minimally affect the operation of the capacitor 304. For instance, the resistor 300 may be 1 ohm and the inductor 304 may be 1 nano-Henry. Of course, these values are merely examples, and many others may also be used. Other variations are also possible. For example, one or more of the resistor 300, inductor 302 and/or capacitor 304 may be connected in parallel. In another example, additional resistors, inductors and/or capacitors may be added. In yet another example, one or more transformers may be used.

Figure 4A:
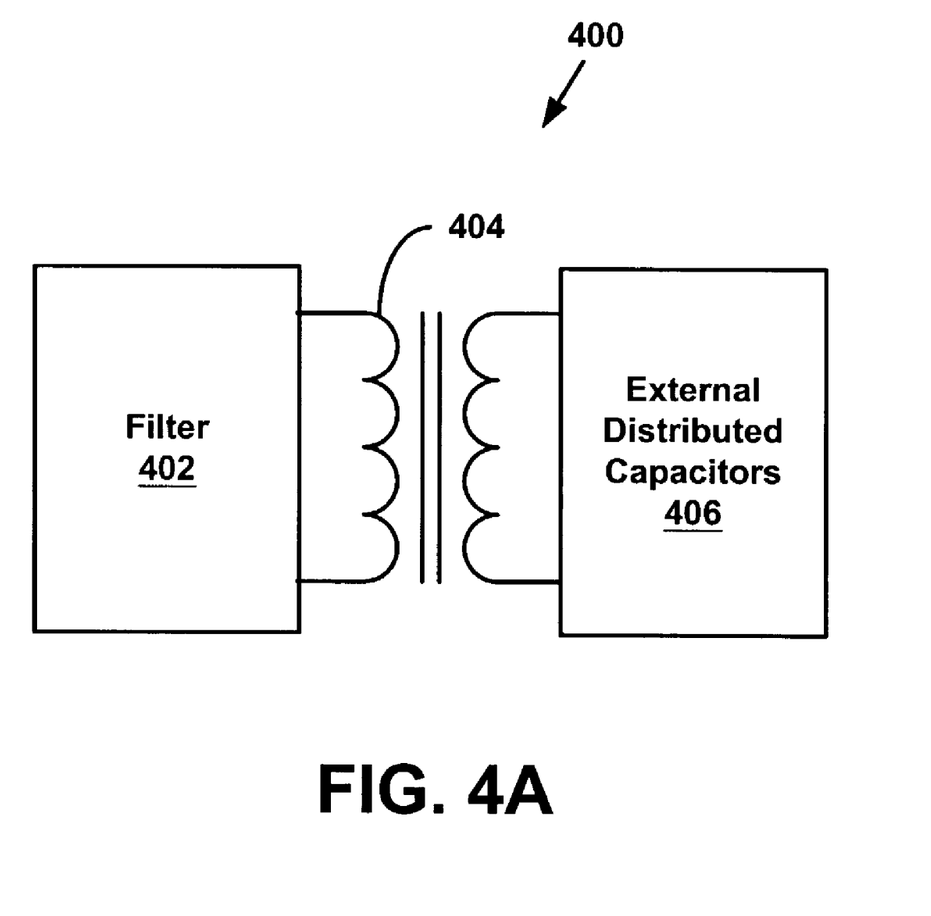
FIGS. 4A-4B are block diagrams of preferred embodiments of front ends that can be used with the system of FIG. 1.

FIG. 4A is block diagram of a preferred embodiment of a front end. The front end described in FIG. 4A may be used, for example, as the front end 102 of FIG. 1. As shown in FIG. 4A, the front end 400 includes a filter 402. The filter 402 is coupled to transformer 404. The transformer 404 is coupled to external distributed capacitors 406. The external distributed capacitors 406 may be coupled to one or more transmission lines.

The filter 402 may be any filter, such as a high pass filter, a low pass filter, a band pass filter, a digital filter or another type of filter. The transformer 404 provides isolation between the filter 402 and the external distributed capacitors 406. The external distributed capacitors 406 may be any number of capacitors. For example, the external capacitors 406 may be capacitors C1 160, C2 162, C3 168, C4 170, C7 176, C8 178.

Figure 4B:
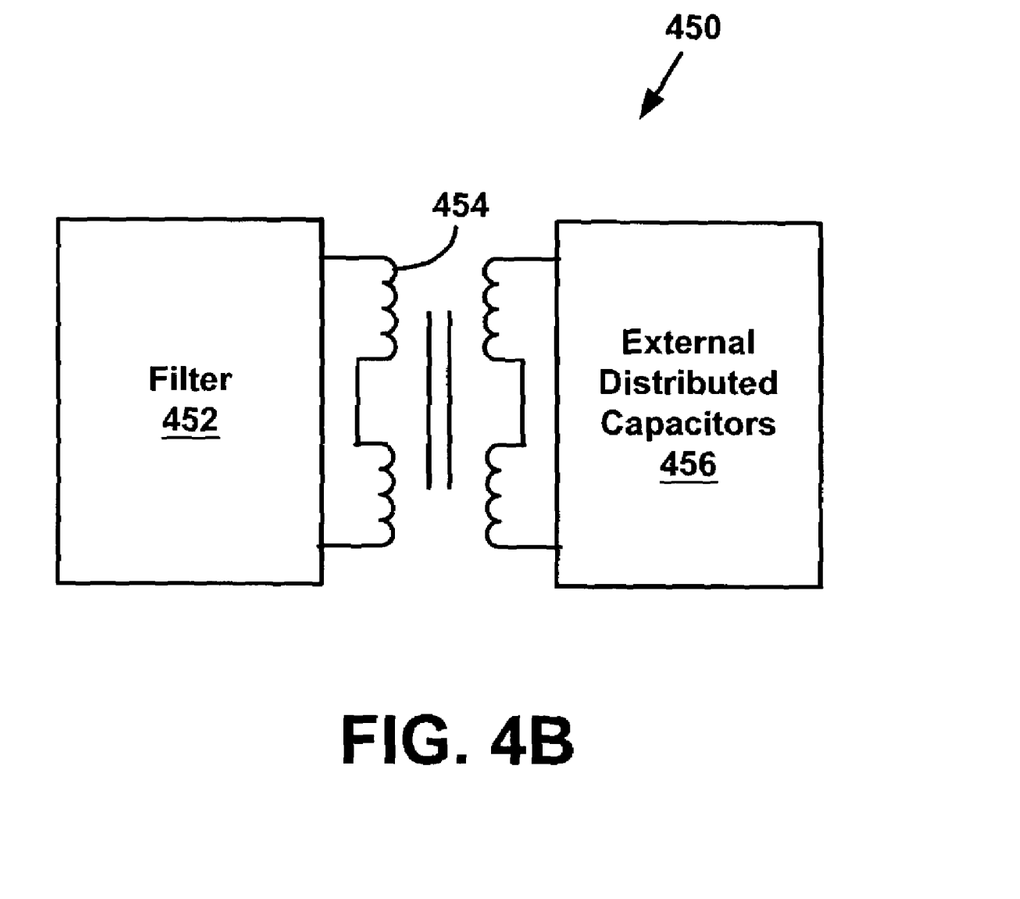

FIG. 4B is a block diagram of another preferred embodiment of a front end, such as may be used as the front end 102 of FIG. 1. As described in FIG. 4B, the front end 450 includes a filter 452, a transformer 454 and external distributed capacitors 456. The external distributed capacitors 456 may be coupled to one or more transmission lines.

The filter 452 may be a low pass filter that has elements that are well known to those skilled in the art. The transformer 454 may be, for example, a center-tap transformer. The transformer 454 may provide isolation between the filter 452 and the external distributed capacitors 456. The external capacitors 456 may be any number of capacitors. For example, the external capacitors 456 may be the capacitors C1 160, C2 162, C3 168, C4 170, C7 176, C8 178.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. A system for connecting devices via multiple transmission lines, the system comprising:
   a front end of a home networking device, wherein the front end includes a filter without a blocking capacitance;
   a first transmission line connected to the front end via a first blocking capacitance, wherein the first blocking capacitance is external to the front end;
   a first user device connected to the first transmission line;
   a second transmission line connected to the front end via a second blocking capacitance, wherein the second blocking capacitance is external to the front end; and
   a second user device connected to the second transmission line.

2. The system of claim 1, further comprising:
   a first subscriber line interface circuit connected to the first transmission line; and
   a second subscriber line interface circuit connected to the second transmission line.

3. The system of claim 2, wherein the first subscriber line interface circuit connects to the first transmission line through at least a first inductor, and wherein the second subscriber line interface circuit connects to the second transmission line through at least a second inductor.

4. The system of claim 1, further comprising:
   a subscriber line interface circuit connected to the first transmission line; and
   a network interface device connected to the second transmission line.

5. The system of claim 4, wherein the subscriber line interface circuit connects to the first transmission line through at least one inductor.

6. The system of claim 1, wherein the first user device is a plain old telephone service device, and wherein the second user device is a plain old telephone service device.

7. The system of claim 1, wherein the first user device is a plain old telephone service device, and wherein the second user device is an asynchronous digital subscriber line device.

8. The system of claim 1, wherein the first and second transmission lines are twisted-pair transmission lines, wherein the first blocking capacitance comprises a first capacitor and a second capacitor, and wherein the second blocking capacitance comprises a third capacitor and a fourth capacitor.

9. The system of claim 8, wherein the first, second, third and fourth capacitors have capacitances of approximately 3300 pF.

10. The system of claim 8, wherein the first, second, third and fourth capacitors have capacitances of approximately 2200 pF.

11. The system of claim 1, wherein the first user device connects to the first transmission line through at least one connector, and wherein the second user device connects to the second transmission line through at least one other connector.

12. The system of claim 1, wherein the first user device and the second user device communicate using a Home Phoneline Networking Alliance network.

13. The system of claim 1, wherein the first user device and the second user device communicate using a Homeplug network.

14. A system of connecting multiple transmission lines in a Home Phoneline Networking Alliance network, the system comprising:
   a front end of a Home Phoneline Networking Alliance device, wherein the front end provides connectivity to a Home Phoneline Networking Alliance network, and wherein the front end includes a filter without a blocking capacitance;
   a first transmission line, wherein the first transmission line connects to the front end via a first blocking capacitance, wherein the first blocking capacitance is external to the front end, wherein the first transmission line connects to a first user device, and wherein the first transmission line is a twisted-pair transmission line; and
   a second transmission line, wherein the second transmission line connects to the front end via a second blocking capacitance, wherein the second blocking capacitance is external to the front end, wherein the second transmission line connects to a second user device, and wherein the second transmission line is a twisted-pair transmission line.

15. The system of claim 14, further comprising:
   a first subscriber line interface circuit connected to the first transmission line; and
   a second subscriber line interface circuit connected to the second transmission line.

16. The system of claim 14, wherein the first subscriber line interface circuit connects to the first transmission line through at least a first inductor, and wherein the second subscriber line interface circuit connects to the second transmission line through at least a second inductor.

17. The system of claim 14, further comprising:
   a subscriber line interface circuit connected to the first transmission line; and
   a network interface device connected to the second transmission line.

18. The system of claim 17, wherein the subscriber line interface circuit connects to the first transmission line through at least one inductor.

19. The system of claim 14, wherein the first user device is a plain old telephone service device, and wherein the second user device is a plain old telephone service device.

20. The system of claim 14, wherein the first user device is a plain old telephone service device, and wherein the second user device is an asynchronous digital subscriber line device.

21. The system of claim 14, wherein the first blocking capacitance comprises a first capacitor and a second capacitor, and wherein the second blocking capacitance comprises a third capacitor and a fourth capacitor.

22. The system of claim 21, wherein the first, second, third and fourth capacitors have capacitances of approximately 3300 pF.

23. The system of claim 21, wherein the first, second, third and fourth capacitors have capacitances of approximately 2200 pF.

* * * * *